United States Patent [19]

Tsuji et al.

[11] 3,891,959

[45] June 24, 1975

[54] CODING SYSTEM FOR DIFFERENTIAL PHASE MODULATION

[75] Inventors: Yoshikazu Tsuji; Yukio Sohma, both of Kawasaki, Japan

[73] Assignee: Fujitsu Limited, Kawasaki, Japan

[22] Filed: Dec. 28, 1973

[21] Appl. No.: 429,156

[30] Foreign Application Priority Data

Dec. 29, 1972 Japan .................................. 48-1508

[52] U.S. Cl. .......................... 340/146.1 AQ; 325/41

[51] Int. Cl.² ............................................ G06F 11/12

[58] Field of Search ......... 340/146.1 AQ, 146.1 BE, 340/172.5; 325/41, 42

[56] References Cited

UNITED STATES PATENTS

| | | | |
|---|---|---|---|
| 3,227,999 | 1/1966 | Hagelbarger | 340/146.1 AQ X |
| 3,571,795 | 3/1971 | Tong | 340/146.1 AQ |
| 3,697,947 | 10/1972 | Macy | 340/146.1 AQ |
| 3,699,516 | 10/1972 | Mecklenburg | 340/146.1 AQ |
| 3,728,678 | 4/1973 | Tong | 340/146.1 AQ |
| 3,806,647 | 4/1974 | Dohne et al. | 325/41 X |

*Primary Examiner*—Malcolm A. Morrison
*Assistant Examiner*—Jerry Smith
*Attorney, Agent, or Firm*—Staas & Halsey

[57] ABSTRACT

This invention is related to a coding system for a differential phase modulation system in which an input signal is coded into a signal including an error correcting code, predetermined bits of the coded signal are used as one symbol, and the phase of a carrier is deviated in accordance with the symbol, said coding system comprising: series-parallel converter means for converting a series input signal into parallel signals, encoder means for encoding each of the converted signals into a signal including an error correcting code, and buffer means for dividing the coded signals into predetermined bits and providing them alternately each in the form of one symbol.

19 Claims, 17 Drawing Figures

FIG. 1
FIG. 2
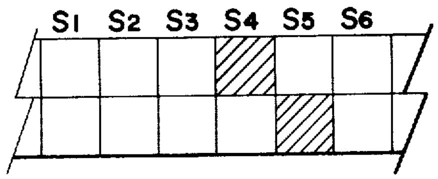
FIG. 3
| Symbol S | (0,0) | (0,1) | (1,1) | (1,0) |
|---|---|---|---|---|
| Phase Shift | 0° | 90° | 180° | 270° |
FIG. 4
| | S1 | S2 | S3 | S4 | S5 | S6 |
|---|---|---|---|---|---|---|
| Transmitting Symbol | | 0 | 1 | 0 | 0 | 1 |
| | | 0 | 1 | 1 | 1 | 0 |
| Transmitting Phase | 0° | 0° | 180° | 270° | 0° | 270° |
| Receiving Phase | 0° | 0° | 180° | 0° | 0° | 270° |
| Receiving Symbol | | 0 | 1 | 1 | 0 | 1 |
| | | 0 | 1 | 1 | 0 | 0 |

TABLE 1

| Precedent bits $(P''Q'')_N$ | Precedent bits $(P''Q'')_G$ | Present bits $(P''Q'')_N$ | Present bits $(P''Q'')_G$ | Modulator input $(p\ q)_G$ |
|---|---|---|---|---|
| 0 0 | 0 0 | 0 0 | 0 0 | 0 0 |
| | | 0 1 | 0 1 | 0 1 |
| | | 1 0 | 1 1 | 1 1 |
| | | 1 1 | 1 0 | 1 0 |
| 0 1 | 0 1 | 0 0 | 0 0 | 0 1 |
| | | 0 1 | 0 1 | 1 1 |
| | | 1 0 | 1 1 | 1 0 |
| | | 1 1 | 1 0 | 0 0 |
| 1 0 | 1 1 | 0 0 | 0 0 | 1 1 |
| | | 0 1 | 0 1 | 1 0 |
| | | 1 0 | 1 1 | 0 0 |
| | | 1 1 | 1 0 | 0 1 |
| 1 1 | 1 0 | 0 0 | 0 0 | 1 0 |
| | | 0 1 | 0 1 | 0 0 |
| | | 1 0 | 1 1 | 0 1 |
| | | 1 1 | 1 0 | 1 1 |

TABLE 2

| Precedent bits $(pq)_N$ | Precedent bits $(pq)_G$ | Present bits $(p\ q)_N$ | Present bits $(pq)_G$ | Recovered bits $(P''Q'')_G$ |
|---|---|---|---|---|
| 0 0 | 0 0 | 0 0 | 0 0 | 0 0 |
| | | 0 1 | 0 1 | 0 1 |
| | | 1 0 | 1 1 | 1 1 |
| | | 1 1 | 1 0 | 1 0 |
| 0 1 | 0 1 | 0 0 | 0 0 | 1 0 |
| | | 0 1 | 0 1 | 0 0 |
| | | 1 0 | 1 1 | 0 1 |
| | | 1 1 | 1 0 | 1 1 |
| 1 0 | 1 1 | 0 0 | 0 0 | 1 1 |
| | | 0 1 | 0 1 | 1 0 |
| | | 1 0 | 1 1 | 0 0 |
| | | 1 1 | 1 0 | 0 1 |
| 1 1 | 1 0 | 0 0 | 0 0 | 0 1 |
| | | 0 1 | 0 1 | 1 1 |
| | | 1 0 | 1 1 | 1 0 |
| | | 1 1 | 1 0 | 0 0 |

FIG. 17

CODING SYSTEM FOR DIFFERENTIAL PHASE MODULATION

BACKGROUND OF THE INVENTION

1. Field of the Invention

This invention relates to a coding system for differential phase modulation in a digital data communication system.

2. Description of the Prior Art

In a digital data communication system, it is ideal to transmit data without producing any errors but, in practice, an error in the signal symbol is caused in the transmission line, so that, in many cases, some error control is required in the receiving station. Especially in the case of data transmission through a satellite system, since the error rate of this satellite system is very high as compared with that of the ground communication system, the error control is indispensable to the transmission. A method heretofore proposed for such an error control is such that a signal employing an error correcting code is transmitted; and, in the receiving station, an error produced in the transmission line is detected and corrected by the error correcting code. The error correcting code is usually composed of an information bit including information and a redundant bit (a parity check bit) related with the information bit by some rule. From the functional point of view, the error correcting code is divided into two kinds of error correcting codes, i.e. a random error correcting code and a burst error correcting code.

The two kinds of error correcting codes are selectively used in accordance with the property of the error produced in the digital data transmission system. Namely, the error is classified into a random error (which is produced at random) and a burst error (which is produced in succession). The random error correcting code is effective in the digital data communication system in which the random error is produced, but its error correcting function is extremely deteriorated in the digital data communication system in which the burst error is produced. On the other hand, the burst error correcting code is effective in the digital data communication system in which the burst error is produced but when it is employed in the digital data communication system in which the random error is produced, its error correcting function is poor as compared with the case of correcting for burst errors and, in addition, the scale of the hardware becomes unnecessarily large.

Generally, in the PSK satellite system, PSK (phase shift keyed) modulation is achieved in the transmitting station and demodulation is effected by synchronous detection in the receiving station, so that ambiguity or unstableness of the phase of the carrier reproduced in the receiving station must be removed by some means. As one method for removing this unstableness of the phase, a differential phase modulation system has been adopted.

In the differential phase shift keyed modulation system, i.e. the DPSK modulation system, the phase of a carrier corresponding to a certain signal symbol is used as the reference and a change in the phase of a carrier corresponding to the next subsequent signal symbol relative to the reference phase, that is, the phase difference between the two carriers, is caused to correspond to the data being transmitted. For example, in the data transmission utilizing phase inversion, if 0 or 1 is used corresponding to the data dependent upon whether the preceding phase is held unchanged or inverted, a phase inversion differential phase modulation system is obtained. In a similar manner, 4-, 8- and multi-phase differential phase modulation systems are obtained.

By the way, in the differential phase modulation system, where the phase of a certain signal is received incorrectly, even if the phase of the next subsequent signal is received correctly, the decision of the data based on the correctly received signal phase becomes incorrect because the phase of the signal to be used as the reference is incorrect and, as a result, a continuous error, that is, the burst error, is produced.

On the other hand, in the satellite system, the error in the transmission line is usually produced by thermal noise and this error can be regarded as the random error. Accordingly, if the differential phase modulation system is employed in the satellite system, a signal having a random error produced in the transmission line is demodulated as a signal having a burst-like and random error. In order to correct the demodulated signal having the burst-like and random error, the burst error correcting code may be used but it is necessary that the burst error correcting code used corrects the signal in a range covering the random error, too, and the burst error correcting code is required to be excellent in its correcting function. As a result of this, the scale of the hardware therefor inevitably becomes large.

In this case, it is also possible to use the random error correcting code but this presents a problem that the random error correcting code used is required to be extremely high in correcting function.

SUMMARY OF THE INVENTION

This invention has for its object to provide a coding system for differential phase modulation which is adapted so that a burst-like error in the differential phase modulation system such as mentioned above may be corrected by the use of a random error correcting code whose correcting function is so low as to be only capable of correcting an error of, for example, one bit, thereby to simplify the hardware.

The coding system of this invention for the differential phase modulation system in which an input signal is coded into a signal including an error correcting code; predetermined bits of the coded signal are used as one symbol, and the phase of a carrier is deviated corresponding to the symbol, is characterized by the provision of series-parallel converting means for converting a series input signal into parallel signals, encoding means for encoding the converted signals into signals including an error correcting code independently of each other and buffer means for dividing the encoded signals into predetermined bits and providing them alternately each in the form of one symbol.

As will be understood from the above, in accordance with this invention, by an appropriate combination of known circuits, the differential phase is produced after changing the order of the symbols, so that there is no possibility of occurrence of the burst-like error. Even if an error is produced, it is a random error, and hence can be corrected with the random error correcting code having a correcting function of about one bit and the hardware required therefor may be small.

BRIEF DESCRIPTION OF THE DRAWINGS

In the detailed description of the preferred embodiments of the invention presented below, reference is made to the accompanying drawings in which;

FIG. 1 is a diagram showing the construction of a digital communication system in which 4-phase differential phase modulation is achieved;

FIGS. 2, 3 and 4 are diagrams illustrating error patterns of received data in the 4-phase differential phase modulation system;

FIG. 17 comprises two tables for illustrating the operation of differential coding and decoding of digital signals in transmitting and receiving operations, respectively.

DESCRIPTION OF THE PREFERRED EMBODIMENTS

Figure 5:
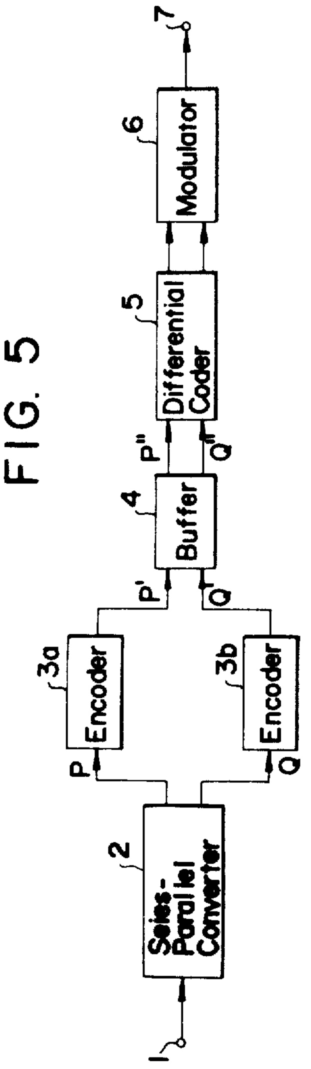
FIG. 5 is a block diagram of the transmitter of apparatus embodying this invention.

This invention is generally applicable to differential phase modulation systems of any phases but will hereinafter be described in detail with regard to a 4-phase differential phase modulation system.

FIG. 1 illustrates the construction of a communication system in which 4-phase differential phase modulation is achieved. In FIG. 1, in a transmitter A a series input signal is divided every two bits and differential phase modulation is achieved such that the phase of a transmission carrier is shifted corresponding to the divided symbols each composed of two bits and the resulting 4-phase modulated signal is transmitted over a transmission line. In a receiver B, the transmitted 4-phase modulated signal is received and subjected to differential phase demodulation to provide digital data corresponding to the phase difference of the continuously received signals.

FIG. 2 exemplifies an error pattern of the demodulated digital data in the above 4-phase differential phase modulation system. This shows the manner in which an error is produced in the demodulated digital data in the case where a wave of a phase different from the transmitted one is erroneously received due to noise or the like in the transmission line of FIG. 1.

In FIG. 2, the hatched parts indicate erroneous bits of the demodulated received data. Namely, assuming that where a certain received phase is erroneous, one of two bits of the demodulated symbol $S_4$ is made wrong; since demodulation of the next received phase is achieved based on the wrong phase preceding it, the next demodulated symbol $S_5$ is affected in this case and at least one of the two bits making up the symbol $S_5$ is made wrong. This will be further described with regard to FIGS. 3 and 4.

FIG. 3 shows one example of the relationships between the symbol S composed of two bits and the phase shift of a carrier corresponding to the symbol S.

FIG. 4 illustrates the relationships of the transmitted phase, the received phase and the received symbol to transmitted symbols $S_1$ to $S_6$ in the case of achieving the 4-phase differential phase modulation based on the relationships shown in FIG. 3. In FIG. 4, the hatched parts indicate errors. For example, in the case where the transmitting phase 270° (a phase shift of 90° from the phase preceding it) corresponding to the symbol $S_4$ is received as 0° (the hatched part) in error, the symbol $S_4$, which should be naturally demodulated as (0, 1), is demodulated as (1, 1) in practice.

Further, in the demodulation of the symbol $S_5$, it is to be demodulated in the form of (0, 1) in response to the normal phase deviation 90° but, since the phase deviation which is based on the received phase of the preceding symbol $S_4$ is 0°, the symbol $S_5$ is demodulated in the form of (0, 0). Namely, even if the transmitted phase of the symbol $S_5$ is correctly received, two successively received symbols, i.e. the symbols $S_4$ and $S_5$, are erroneous just like the burst-like error.

By the application of this invention, such a burst-like error can be rendered into a random error. This will hereinbelow be described in connection with FIGS. 5 to 8.

FIGS. 5 to 8, which are explanatory of one example of this invention, are a block diagram of the transmitter in the case of applying a random error correcting (4, 3) code to the 4-phase differential phase modulation system, a detailed block diagram of the principal part of the transmitter, a detailed block diagram of one part of the transmitter and a block diagram of the receiver, respectively. The random error correcting (4, 3) code is composed of three information bits and one parity bit.

In FIG. 5, reference numeral 1 indicates an input signal terminal; 2 designates a series to parallel converter; 3*a* and 3*b* represent encoders; 4 identifies a buffer circuit; 5 denotes a differential coder; 6 shows a modulator; and 7 refers to an output signal terminal.

Figure 6:
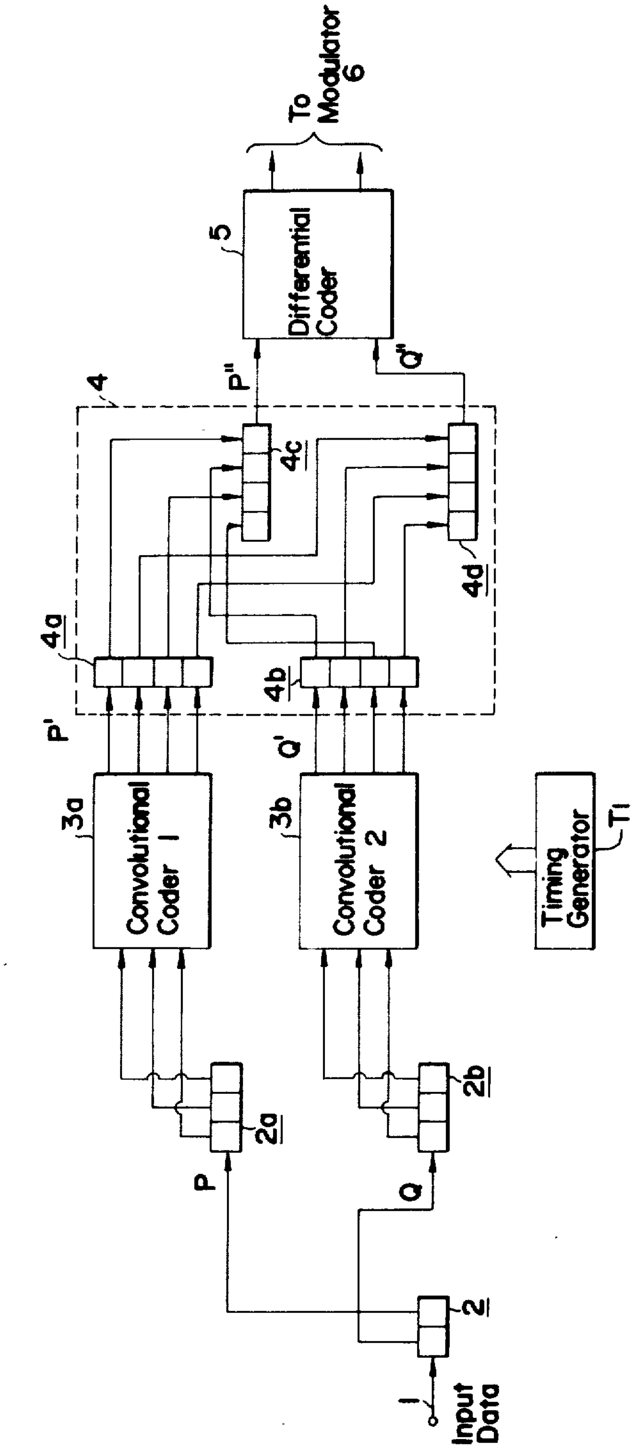
FIG. 6 is a block diagram showing in detail the principal part of the transmitter depicted in FIG. 5.
Figure 7:
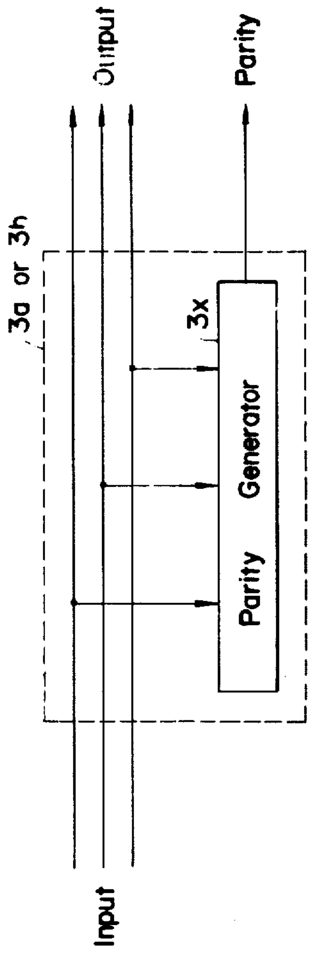
FIG. 7 is a block diagram of an encoder.

FIG. 6 is a block diagram showing more in detail the transmitter depicted in FIG. 5, illustrating it from its input signal terminal 1 to the differential coder 5. The parts corresponding to those in FIG. 5 are identified by the same reference numerals. Each part of the transmitter will hereinbelow be described. Reference character $T_1$ designates a timing generator, which supplies a timing pulse to the transmitter.

On the parallel-series converter 2:

This is composed of two flip-flops, by which a series data signal applied to the input signal terminal 1 is converted into two parallel signals. The one of the two parallel signals is applied to a series-parallel converter 2*a* composed of three flip-flops and further converted thereby into three parallel signals, while, the other parallel signal is similarly applied to a series-parallel converter 2b composed of three flip-flops and further converted thereby into three parallel signals. The series-parallel converters 2*a* and 2*b* are omitted in FIG. 5.

On the encoders 3*a* and 3*b*:

These encoders are composed of first and second convolutional coders. The operation of the convolutional coder 3*a* or 3*b* will be described with regard to FIG. 7. The convolutional coder used is convolutional (4, 3) coder, which is provided with a parity generator $3x$ as shown. When supplied with the parallel signals of three bits, the convolutional coder applies them to the parity generator $3x$ composed of, for example, a shift register and a modulo 2 adder and provides signals of four bits, i.e. information signals of three bits and a parity of one bit. As is known, the parity generator $3x$ is constructed corresponding to the error correcting code used.

On the buffer circuit 4:

This comprises registers $4a$ and $4b$ and shift registers $4c$ and $4d$, each composed of four flip-flops. The parallel signals of four bits derived from the convolutional coder $3a$ are stored simultaneously in the register $4a$ and the parallel signals of four bits from the convolutional coder $3b$ are also stored in the register $4b$. The outputs from the registers 4a and $4b$ are mixed together by the shift registers $4c$ and $4d$. Namely, two of the four outputs from the register $4a$ are applied to alternate ones of the flip-flops of the shift register $4c$ and the two remaining outputs are applied to alternate ones of the flip-flops of the shift register $4d$. In a similar manner, the four outputs from the register $4b$ are also applied to the shift registers $4c$ and $4d$. By this operation, parallel signals of two bits, are applied to the differential coder 5 from register $4c$ and $4d$ of buffer 4, and these two parallel bits are derived alternately from the registers $4a$ and $4b$ , and are supplied in succession to the differential coder 5.

Figure 8:
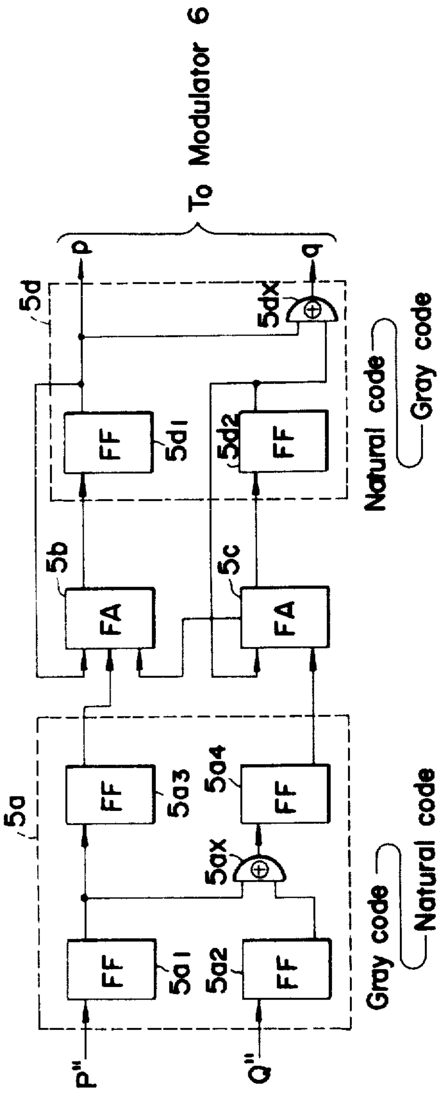
FIG. 8 is a block diagram of a differential coder.

On the differential coder 5:

This employs differential logic responsive to the parallel signals of two bits and serves to produce coded signals which are applied to the modulator 6. This differential coder 5 is shown in detail in FIG. 8. In FIG. 8, the differential coder 5 is comprised of a code converter circuit $5a$ for converting a gray code into a natural code, full adders $5b$ and $5c$ for providing a differential logic of the natural code and a code converter circuit 5d for converting the natural code into the gray code. The code converter circuit 5a is composed of four flip-flops $5a_1$, $5a_2$, $5a_3$ and $5a_4$ and an exclusive-or circuit $5ax$ and the code converter circuit $5d$ is composed of two flip-flops $5d_1$ and $5d_2$ and an exclusive-or circuit $5dx$. The conversion of the gray code into the natural code for obtaining the differential logic with the full adders $5b$ and $5c$ is intended to simply the circuit construction and if there is no need of simplifying the circuit construction, it is possible to obtain the differential logic without converting the gray code into the natural code. Table 1 (FIG. 17) shows the results of processing the digital signals by the differential logic. In this table, suffixes "N" and "G" represent the natural and gray codes respectively and numeral values to which attention is paid are surrounded by broken lines. Table 1 (FIG. 17) shows the differential logic assuming that in the case of the information bits being (0, 0), (0, 1), (1, 1) and (1, 0), the phase deviations of the carrier are 0°, 90°, 180° and 270°, respectively. More specifically, Table 1 shows in each of the four horizontal segments, a specific precedent bit, pair (left vertical column), the noted succession of present bits relative thereto (center vertical column) and the resultant differentially coded, corresponding succession of bit pairs as supplied to the modulator (right vertical column).

Next, the receiver will be described.

Figure 9:
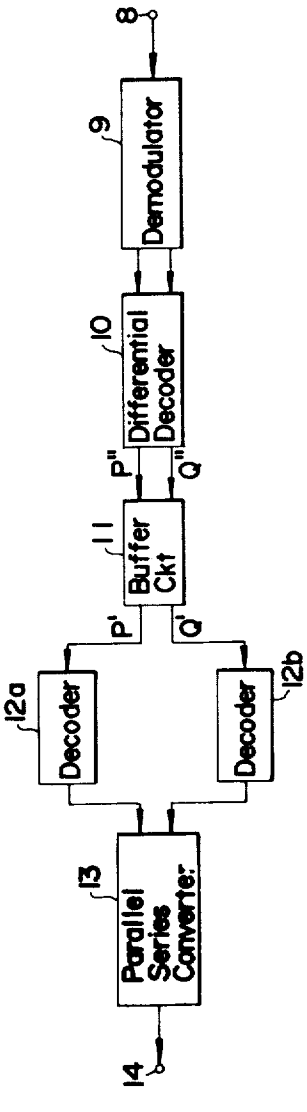
FIG. 9 is a block diagram of a receiver.

In FIG. 9, reference numeral 8 indicates an input signal terminal; 9 designates a demodulator; 10 denotes a differential decoder; 11 identifies a buffer circuit; $12a$ and $12b$ represent decoders; 13 refers to a parallel-series converter; and 14 shows an output signal terminal.

Figure 10:
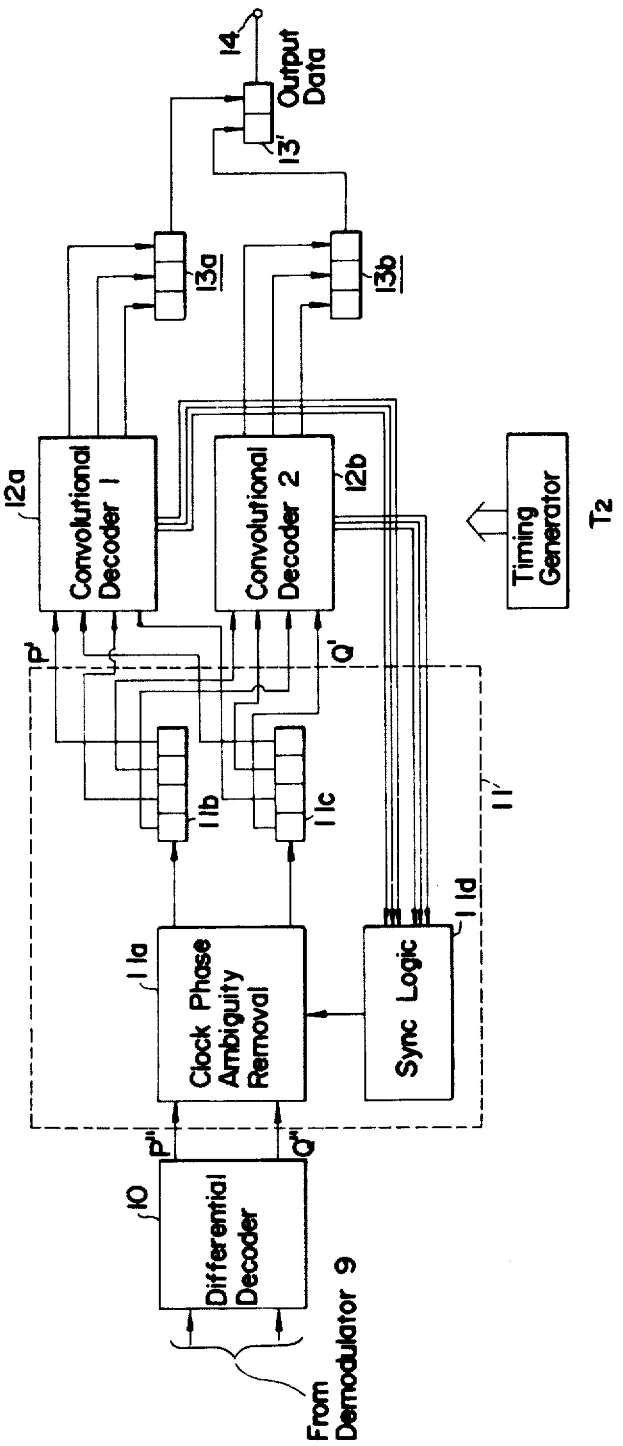
FIG. 10 is a block diagram showing in detail the principal part of the receiver depicted in FIG. 9.

FIG. 10 is a block diagram showing more in detail the receiver depicted in FIG. 9, and illustrating it from the differential decoder 10 to the output signal terminal 14. The parts corresponding to those in FIG. 9 are marked with the same reference numerals. Each part of the receiver will hereinbelow be described. Reference character $T_2$ indicates a timing generator, which supplies a timing pulse to the receiver.

Figure 11:
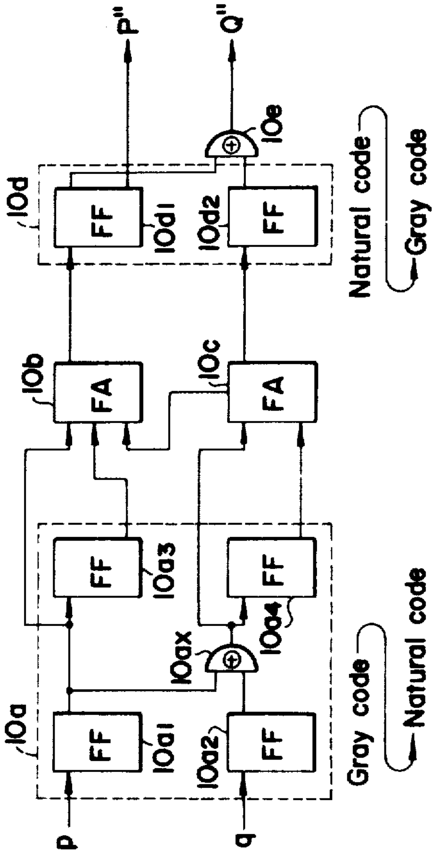
FIG. 11 is a block diagram of a differential decoder.

On the differential decoder 10:

This circuit serves to remove the differential coding from the succession of parallel signals of two bits as received, and to provide the original signal, that is, it performs the operation opposite that of the differential coder 5 of the transmitter. FIG. 11 shows the differential decoder 10 in detail. Namely, in FIG. 11, the differential decoder 10 is comprised of a code converter circuit 10a for converting the gray code into the natural code, full adders $10b$ and $10c$ for removing the differential coding from the signals as now corrected to the natural code, a code converter circuit $10d$ for converting the signals from the natural code into the gray code and an exclusive-or circuit $10e$. The code, converter circuit $10a$ is provided with four flip-flops $10a_1$, $10a_2$, $10a_3$ and $10a_4$ and an exclusive-or circuit 10ax, and the code converter circuit $10d$ is provided with two flip-flops $10d_1$ and $10d_2$. In this case, too, code conversion is achieved for simplification of the circuit construction and, if necessary, the operation for removing the differential logic may be achieved without converting the gray code into the natural code. Table 2 shows the differential logic of the receiver on the same assumption as that referred to above in connection with Table 1.

On the buffer circuit 11:

This circuit is composed of a clock phase ambiguity removal circuit $11a$, 4-bit registers $11b$ and $11c$ each composed of four flip-flops and a synchronous circuit $11d$.

Figure 12:
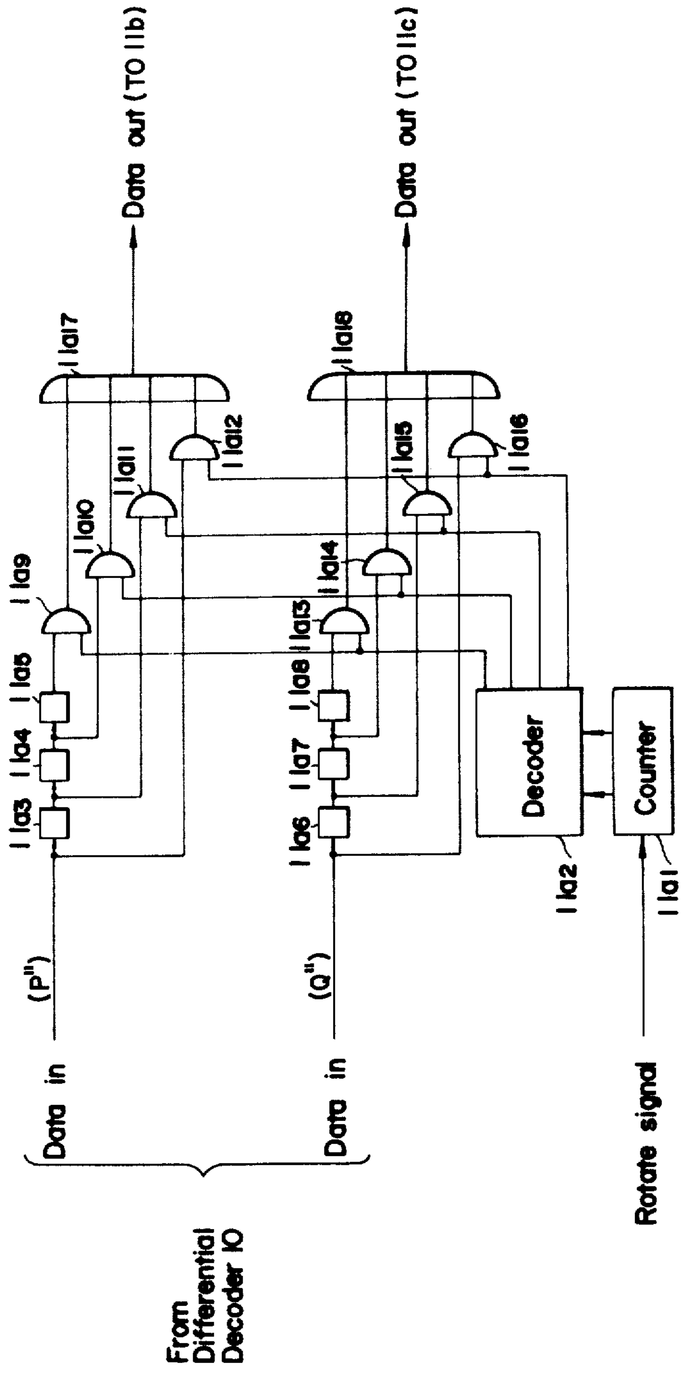
FIG. 12 is a block diagram of a clock phase ambiguity removal circuit.

The clock phase ambiguity removal circuit $11a$ is a circuit for changing the sequence of the signals (blocks) composed of four bits, which are applied to the decoders $12a$ and $12b$ and this circuit is depicted in FIG. 12 in detail. In FIG. 12, the clock phase ambiguity removal circuit 11a comprises a 2-bit binary counter $11a_1$ capable of four counting, a decoder $11a_2$, delay circuits $11a_3$, $11a_4$, $11a_5$, . . . and $11a_8$ composed of flip-flops, AND gate circuits $11a_9$, $11a_{10}$, $11a_{11}$, . . . and $11a_{16}$ and OR circuits $11a_{17}$ and $11a_{18}$. The count of counter $11a_1$ is controlled by rotate signals which are applied thereto from the synchronous circuit $11d$, the count advancing to four and then resetting to repeat the count accumulation in a cyclic manner. The output from the counter $11a_1$ is decoded by the decoder $11a_2$ and then, according to its values, for example, (0, 0) (0, 1), (1, 0) and (1, 1), one of pairs of the AND gate circuits $11a_9$ and $11a_{13}$, $11a_{10}$ and $11a_{14}$, $11a_{11}$ and $11a_{15}$ and $11a_{12}$ and $11a_{16}$ is actuated. For example, where the AND gate circuits $11a_9$ and $11a_{13}$ are turned on, the sequence of data is applied to them through the flip-flops forming the delay circuit of flip-flops $11a_3$, $11a_4$ and $11a_5$ and the delay circuit of flip-flops $11a_6$, $11a_7$ and $11a_8$, providing an output delayed by three bits.

Where the AND gate circuits $11a_{12}$ and $11a_{16}$ are turned on, the sequence of data is not delayed. Thus, the clock phase ambiguity removal circuit produces data outputs from the input data in four manners, i.e. non-delayed, 1-bit delayed, 2-bit delayed and 3-bit delayed. They are selected dependent upon the value which the decoder $11a_2$ decodes from the count content of the counter $11a_1$.

One of the two parallel signals derived from the clock phase ambiguity removal circuit 11*a* is subjected to series-parallel conversion in the register 11*b* and the other parallel signal is also subjected to series-parallel conversion in the register 11*c*. The resulting parallel signals of eight bits in all are applied to the decoders 12*a* and 12*b* by an operation corresponding to the mixing operation effected previously in the transmitter.

Figure 13:
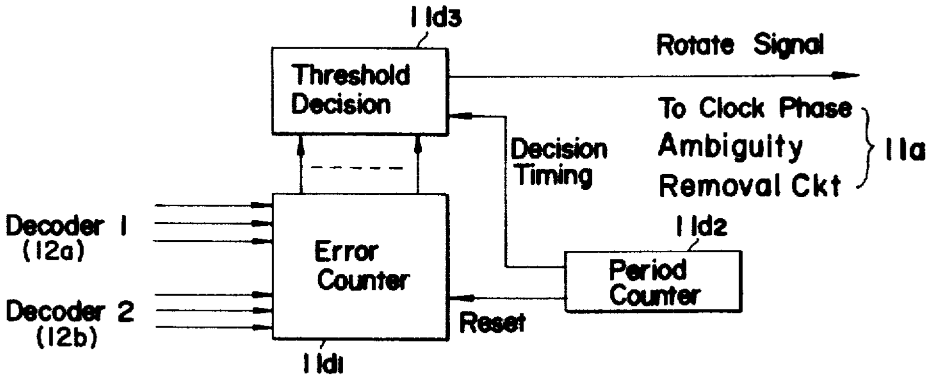
FIG. 13 is a block diagram of a synchronous logic circuit.

The synchronous circuit 11*d* is a circuit which decides whether or not the input signals to the decoders 12*a* and 12*b*, that is, 4-bit parallel signals, which are delayed in the four manners, are correctly delayed and when the circuit decides that the clock phase is wrong, it applies the rotate signal to the clock phase ambiguity removal circuit 11*a*. The synchronous circuit 11*d* is shown in detail in FIG. 13. In FIG. 13, the synchronous circuit 11*d* comprises an error counter $11d_1$, a period counter $11d_2$ and a threshold decision circuit $11d_3$. The error counter $11d_1$ counts correction pulses supplied from the decoders 12*a* and 12*b*. The period counter $11d_2$ counts a certain period of time and applies a decision timing signal to the threshold decision circuit $11d_3$ to instruct it to detect how many times correction is achieved within the certain period of time. Based on the above decision timing signal, the threshold decision circuit $11d_3$ periodically examines whether the counting by the error counter $11d_1$ exceeds a predetermined threshold value or not. If the counting is in excess of the threshold value, it is considered that the clock phase is wrong and the rotate signal, which is a control signal for changing the clock phase, is applied to the clock phase ambiguity removal circuit 11*a*.

Figure 14:
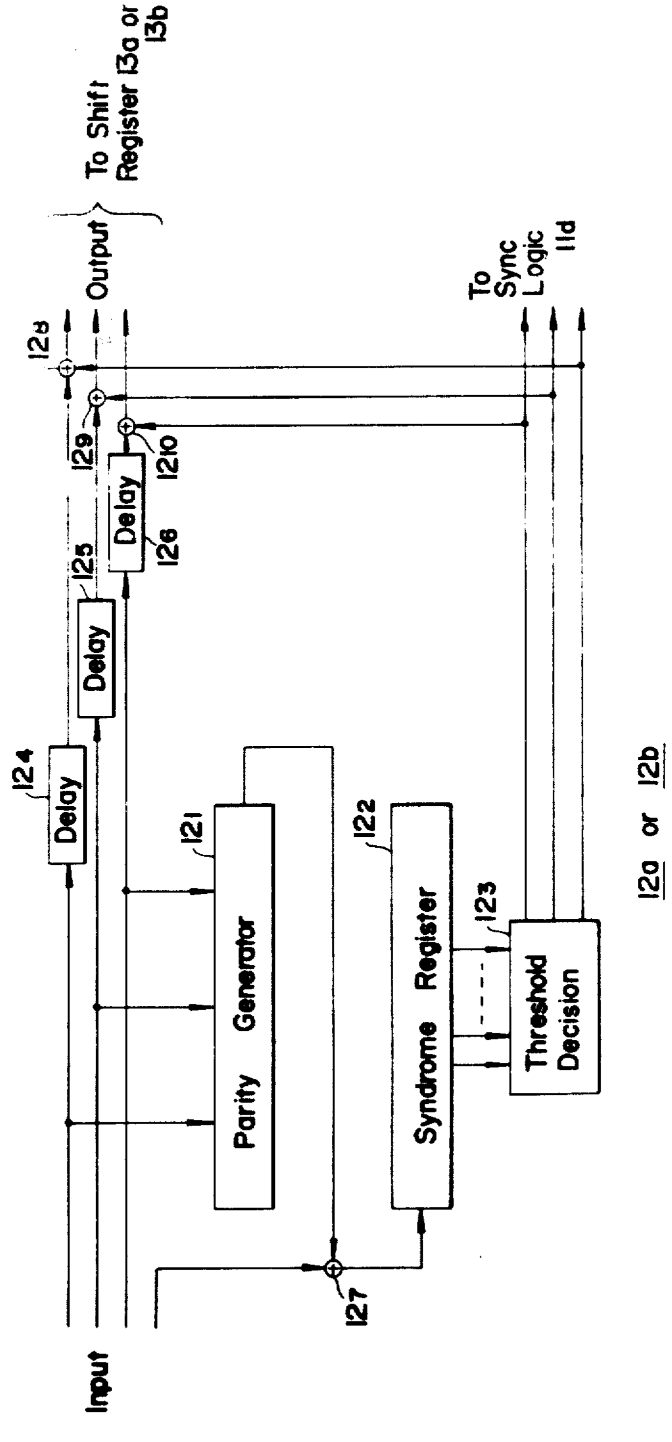
FIG. 14 is a block diagram of a convolutional decoder.

On the decoders 12*a* and 12*b*:

These decoders are each composed of a convolutional decoder, which is shown in detail in FIG. 14. The convolutional decoder used herein is a convolutional (4, 3) decoder, which is provided with a parity generator $12_1$, a syndrome register $12_2$, a threshold decision circuit $12_3$, delay circuits $12_4$, $12_5$ and $12_6$ and exclusive-or circuits $12_7$, $12_8$, $12_9$ and $12_{10}$. Based on the three information bits except the parity check bit, which are applied to the convolutional decoder from the register 11*b* or 11*c*, the parity generator produces a new parity bit in the same manner as that in the convolutional (4, 3) coder. The new parity bit and the received parity bit are compared with each other in the exclusive-or circuit $12_7$ and 0 or 1 is applied to the syndrome register $12_2$ dependent on whether the parity bits are coincident with each other or not. The syndrome register $12_2$ stores therein the aforesaid logic 1 and supplies the threshold decision circuit $12_3$ with a control signal from a tap properly selected by the error correcting code used. The threshold decision circuit $12_3$ decides, for example, by majority, whether correction should be made or not. In the case of correction, a correction pulse is applied to any one of the exclusive-or circuits $12_8$, $12_9$ and $12_{10}$ and to the synchronous circuit 11*d*. The delay circuits $12_4$ to $12_6$ are provided so that the correction may be coincident with a bit to be corrected, and they are usually formed with flip-flops.

On the shift register 13*a* and 13*b*:

These registers provide means by which the outputs from the decoders 12*a* and 12*b*, that is, the 3-bit information signals except the parity check bit, are subjected to parallel-series conversion. In FIG. 9, the registers are not specifically shown, but may be considered as incorporated in the parallel to series converter 13.

On the parallel-series converter 13:

By this converter 13, the parallel trains of series signals, converted by the shift registers 13*a* and 13*b*, are further converted into a single train of series signals to provide the original transmitted data, at the output terminal 14.

Turning now to FIGS. 15A to 15D, the operation of the system of the invention i.e., as practised by the apparatus constructed as described above, will be described, in relation to use of the transmitter of FIG. 5.

A. The series train of input digital signals $i_1, i_2, i_3, \ldots$ are applied to the input signal terminal 1.

B. The input signals $i_1, i_2, i_3, \ldots$ are converted by the series-parallel converter 2 into the following parallel trains of digital signals (FIG. 15B):

$P=i_1, i_4, i_5, \ldots$ $Q=i_2, i_4, i_6, \ldots$

Figure 15:
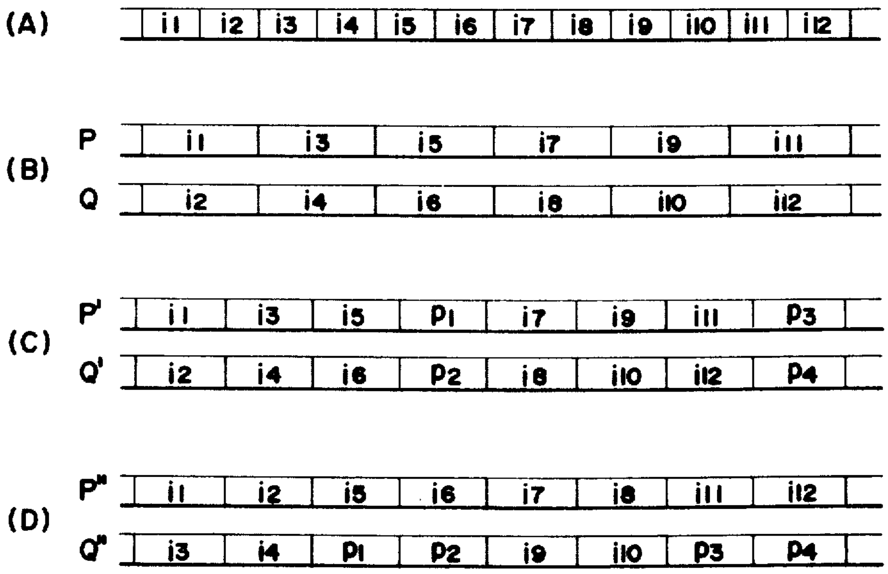
FIG. 15 shows a series of diagrams, for explaining the order for practising this invention.

C. The parallel trains of digital signals P and Q are applied to the encoders 3*a* and 3*b* respectively to obtain the following (4, 3) coded digital signal trains (FIG. 15C):

$P'=i_1, i_3, i_5, P_1, \ldots$ $Q'=i_2, i_4, i_6, P_2, \ldots$ $P_1$ and $P_2$ represent parity bits. It will be understood that the bit trains P' and Q' of FIG. 15*c* are illustrated in serial fashion to enable comparison with the bit trains of the related FIGS. 15*a*, *b*, and *d*. However, in the specifically illustrated block diagram of the transmitter of FIG. 6 and of the receiver of FIG. 10, the parallel bit trains P and Q are initially converted to successive, parallel groups of a predetermined number of bits each. For example, in FIG. 6, the bit train P is converted by the register 2*a* into successive groups of three parallel bits—the train Q correspondingly is converted by register 2*b*. The convolutional coders 3*a* and 3*b* are shown in detail in FIG. 7 and are seen to receive the respective groupings of three bits each, in parallel, for purposes of developing the parity bit by the generator 3*x*. The buffer 4*a* accordingly receives the three information bits and the related parity bit in parallel in its input register 4*a*, as to the train P'. Similarly, buffer 4*b* receives three information bits and a parity bit in parallel, as to the train Q'. These respective groupings of information and parity bits then are subject to further selection by the buffer 4 in developing the succession of symbols as the parallel output bit trains P'' and Q''.

It should be recognized, however, that the serial trains P and Q could be processed alternatively in serial fashion in developing the coded trains P' and Q' whereby the parity bits would be inserted in the correct position in each such serial train in relation to a corresponding grouping of a predetermined number of information bits. Such a serial train would then be subject to serial to parallel conversion at the input to buffer 4a. Accordingly, in the specification and claims of this application, it is to be understood that the description of the signals P' and Q' as trains is intended to encompass either the processing of successively selected groupings of the bits in parallel or the processing thereof in serial fashion, both as to the encoding for producing error correcting codes in those signals P' and Q' and as to the selection function by the buffer in developing the succession of output symbols.

D. The parallel trains of signals P' and Q' derived from the encoders 3*a* and 3*b* are both applied to the buffer circuit 4 and each is divided into 2-bit signals representing a corresponding symbol, the symbols then being derived in alternate succession from the trains P' and Q' in the buffer circuit 4, providing the following parallel trains of digital output signals:

$P''=i_1, i_2, i_5, i_6, \ldots$ $Q''=i_3, i_4, P_1, P_2, \ldots$

This operation will be described more in detail with regard to FIG. 6. Namely, in FIG. 6, the encoders 3*a* and 3*b* perform the (4, 3) coding operation, so that the outputs P' and Q' from these encoders 3*a* and 3*b* are produced in groups of four bits at the same timing interval and are applied such as to the registers 4*a* and 4*b* respectively. The contents stored in the registers 4*a* and 4*b* are simultaneously read out at the next timing interval and applied to the shift registers 4*c* and 4*d*. The contents thus stored in the shift registers 4*c* and 4*d* have digital signal, or bit arrangements as indicated by P'' and Q'' in FIG. 15D. Then, the contents of the shift registers 4*c* and 4*d* are sequentially and simultaneously read out at a timing rate four times as fast as the aforementioned one producing the symbol sequential parallel trains P'' and Q''.

The signals P'' and Q'' thus obtained are applied to the differential coder 5. The differential coder 5 determines the phase deviation, or shift from the preceding carrier phase in accordance with the symbol applied to the coder 5, and produces a code signal corresponding to the absolute phase position of the transmission carrier. Further, the phase of the carrier is deviated by the modulator 6 in accordance with the code signal output from the differential coder 5 and a phase modulated signal is derived at the output signal terminal 7 and transmitted properly.

In the receiver, the operations effected in the transmitter are achieved in the reverse order to demodulate the original signal.

Namely, as shown in FIG. 9, in the receiver, the phase modulated signal is received at the input terminal 8 and applied to the demodulator 9 and the differential decoder 10 to obtain the signals P'' and Q'' of FIG. 15D, which are then applied to the buffer circuit 11, providing the signals P' and Q' of FIG. 15C. These signals P' and Q' are decoded by the separate decoders 12*a* and 12*b* respectively to obtain the signals P and Q of FIG. 15B. Further, the outputs from the decoders 12*a* and 12*b* are converted by the parallel-series converter 13 into the series signal of FIG. 15A.

Thus, in the present invention, where a certain symbol i.e. a related, (parallel) bit pair, of the parallel bit signals P'' and Q'' of FIG. 15D derived from the differential decoder 10, for example, $(i_1, i_3)$, is erroneous, the error exerts an influence on the next successive symbol $(i_2, i_4)$ in view of the phase differential decoding of the successive symbols, and one or the other of the bits of the said next successive symbol $(i_2, i_4)$ is decoded erroneously. This results in the burst type of error in that an error in one symbol produces errors in the successive symbols; but, since these symbols $(i_1, i_3)$ and $(i_2, i_4)$ are decoded by the different decoders 12*a* and 12*b*, the error of the signal applied to each of the decoders 12*a* and 12*b* is only a random error i.e., only one symbol is erroneous. In each of the decoders 12*a* and 12*b*, the random error is corrected by the parity bit added by the random error correcting logic.

Accordingly, with the present invention, it is possible to correct an error by using a random error correcting code of low correcting function.

Figure 16:
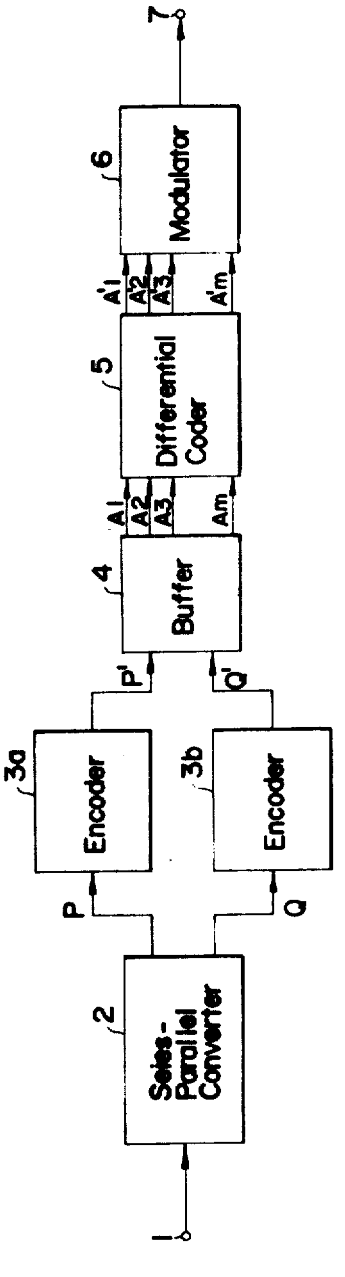
FIG. 16 is a block diagram of a transmitter which is employed in the case where this invention is applied to $2^m$-phase differential modulation.

FIG. 16 is a block diagram illustrating an example of apparatus which is employed in the case where the random error correcting code is applied to a $2^m$-phase differential phase modulation system. The parts corresponding to those described previously with regard to FIG. 5 are identified by the same reference numerals and no detailed description will be repeated. In FIG. 16, reference characters $A_1, A_2, A_3, \ldots$ and $A_m$ indicate output signals from the buffer circuit 4 and $A_1', A_2', A_3', \ldots A_m'$ designate output signals from the differential coder 5.

It will be apparent that many modifications and variations may be effected without departing from the scope of the novel concepts of this invention.

What is claimed is:

1. A coding system for a differential phase modulation system for coding an input, serial bit signal into a signal including an error correcting code, and wherein each successive, predetermined number of bits of the thus coded signal defines a respectively corresponding symbol, and the phase of a carrier is shifted in accordance with each successive symbol, said coding system comprising:
   - series-to-parallel converter means for receiving and converting an input, serial bit signal into parallel, serial bit signals,
   - encoder means for receiving the parallel signals from said converter means and encoding each of the parallel signals with respectively corresponding error correcting codes, and producing corresponding, parallel coded signal outputs,
   - buffer means for receiving the parallel, coded signals from said encoder means and selecting a predetermined number of bits in alternate succession from each thereof, each said predetermined number of bits defining a corresponding symbol, and said buffer means providing the thus defined symbols in serial succession as an output.

2. A coding system according to claim 1, wherein the series-to-parallel converter means is composed of a predetermined number of flip-flops.

3. A coding system according to claim 1, wherein the encoder means comprises a convolutional coder including a parity generator responsive to the bits of each said parallel signal for generating respectively corresponding parity check bits as the error correcting code for each said parallel signal.

4. A coding system according to claim 1, wherein each symbol comprises at least two bits, and wherein the buffer means comprises:
   - at least two registers for storing therein the parallel signal outputs of the encoder means,
   - at least two shift registers each having a corresponding plurality of stages with individual inputs thereto, and
   - means for supplying the said predetermined number of bits, of each of said alternate succession thereof, to the inputs of respectively corresponding, successive stages of said at least two shift registers and for simultaneously advancing said shift registers to read out the bits simultaneously from the corresponding stages thereof and in succession for the plurality of stages thereof, thereby providing said output comprising the said succession of symbols.

5. In combination with the coding system of claim 1, a decoding system in a differential phase demodulation system of a receiver for receiving the differentially phase modulated signal produced by said modulator, the receiver having a demodulator for producing a demodulated serial succession of symbols from the said received signal, said decoding system comprising:

receiver buffer means for receiving the demodulated serial succession of symbols and selecting said symbols in alternate succession to produce parallel, coded signal outputs, decoder means receiving the parallel, coded outputs of said receiver buffer means and responding to the error correcting codes of each thereof for determining the accuracy of the digital bit signals and for correcting erroneous bits therein in accordance with the error correcting codes, and producing as corresponding, parallel outputs, the thus corrected and decoded digital bit signals, and parallel to serial converter means for receiving the parallel decoded outputs of said decoder means and producing a serial bit signal output corresponding to the serial bit signal input to said coding system.

6. In a differential phase modulation system, an error coding system comprising:

a serial to parallel converter for converting a train of series digital signals into a pre-established number of parallel such trains, means for encoding each of said parallel trains with further digital signals comprising error correcting codes, thereby to produce corresponding, encoded parallel outputs of said pre-established number, and means for receiving said encoded parallel outputs of said encoding means and selecting a predetermined number of digital signals from each thereof, in succession for all of said parallel encoded outputs and for all digital signals of each thereof, each said selected, predetermined number of digital signals corresponding to a symbol, and said selecting means producing said successively selected symbols in serial succession as a symbol sequential digital signal output.

7. In a differential phase modulation system as recited in claim 6 further having a modulator for modulating the phase of a carrier for transmission of the digital signals, said error coding system further comprising:

differential coding means establishing for each said symbol, a respectively corresponding differential phase value for the carrier, said differential coding means receiving the symbol sequential digital signal output and determining the absolute phase of the carrier for each successive symbol in accordance with the respectively corresponding differential phase value and the absolute phase value defined thereby for the next preceding symbol, said differential coding means supplying said absolute phase values to said modulator for phase modulation of the carrier.

8. In combination with the coding system of claim 7, a decoding system in a differential phase demodulation system of a receiver for receiving the differentially phase modulated signal produced by said modulator, and having a demodulator for producing a demodulated, serial succession of symbols from the said received signal, said decoding system comprising:

receiver buffer means for receiving the demodulated serial succession of symbols and selecting said symbols in alternate succession to produce parallel, coded signa outputs, decoder means receiving the parallel, coded outputs of said receiver buffer means and responding to the error correcting codes of each thereof for determining the accuracy of the digital signals and correcting erroneous digital signals therein in accordance with the error correcting code, said decoder means producing as corresponding, parallel outputs, the thus corrected and decoded digital signals, and parallel to serial converter means for receiving the parallel decoded outputs of said decoder means and producing a serial digital signal output corresponding to the serial digital signal input to said coding system.

9. An error coding system as in claim 6 further comprising:

register means respectively corresponding to and receiving the parallel outputs of said serial to parallel converter, each said register selecting a preselected number of the digital signals of the corresponding parallel train received thereby, in succession, for supply to said encoding means, said encoding means establishes an error correcting code for each of the said succession of pre-selected numbers of digital signals of each said parallel train as supplied thereto by said register means and produces the said pre-selected number of digital signals encoded with the associated error correcting code as an output, and said receiving and selecting means receives the encoded parallel outputs of said encoding means and selects the said predetermined number of digital signals in succession from said encoded parallel outputs, and for all digital signals of each said parallel output, to produce said symbol sequential digital output signal.

10. A coding system as recited in claim 9 wherein said receiving and selecting means further comprises:

registers equal in number to said predetermined number, each having at least a first stage, means for supplying the individual digital signals of each said selected, predetermined number thereof to corresponding stages of respective ones of said registers for storage therein, and means for reading out the stored signals from the registers simultaneously to produce the signals stored in the corresponding stages as parallel outputs comprising a symbol, and in succession for corresponding, successive stages of the registers, thereby forming said symbol sequential digital signal output.

11. An error coding system as recited in claim 9 wherein:

said encoding means supplies each said preselected number of digital signals encoded with the associated error code in a parallel group as an output, for each of said encoded parallel outputs thereof, and said receiving and selecting means includes input registers corresponding to the parallel encoded outputs of said encoding means for receiving the respectively corresponding parallel groups of encoded digital signals.

12. A coding system as recited in claim 11 wherein said coding means produces a parity bit digital signal as the error correcting code for each said pre-selected number of digital signals.

13. A coding system as recited in claim 11 wherein said predetermined number of digital signals selected by said selecting and receiving means is two, and there are provided two said registers, each symbol thus comprising two parallel digital bit signals.

14. A coding system as recited in claim 11 wherein said predetermined number of digital signals selected by said selecting and receiving means is "m", and there are provided "m" registers, each symbol thus comprising "m" parallel digital bit signals.

15. In a receiver of differentially phase modulated signals coded with error correcting codes, said receiver having a demodulator for producing from the received signal a succession of symbols, each symbol comprising a predetermined number of parallel digital signals, a decoding system comprising:

buffer means for receiving the said succession of symbols and selecting said symbols in alternate succession to produce parallel, coded signal outputs, decoder means receiving the parallel, coded outputs of said buffer means for identifying an error correcting code in each said parallel coded output and determining the accuracy of the received digital signals in accordance with the identified error correcting code and producing an output when a digital signal is in error, said decoder further including means for correcting erroneous digital signals in accordance with the error correcting code and producing corrected and decoded, parallel digital signal outputs corresponding to the parallel coded outputs received thereby from said buffer means, and parallel-to-serial converter means for receiving the parallel decoded and corrected outputs of said decoder means and producing a serial digital signal output.

16. A decoder as recited in claim 15 wherein said buffer means includes:

a phasing control circuit for receiving the said demodulated serial succession of symbols and including selectively controlled delay circuits corresponding in number to the number of parallel coded signal outputs of said buffer means, and said decoder further includes means for receiving the output of said error determining means to define the frequency with which the received digital signals are in error, and means establishing an error frequency threshold value and responsive to the error frequency defined by said defining means for comparison of that said error frequency with the established error frequency threshold value to control the period of delay of the succession of symbols effected by the said delay circuits of the phasing control circuit, thereby to correct the phasing of the received signals as supplied by said buffer means to said decoder.

17. A decoder as recited in claim 16 wherein said error correcting code comprises a parity bit and each of said parallel coded outputs of said buffer means comprises successive, pre-selected numbers of digital bit signals including an associated parity bit, and wherein said delay circuits of said phasing control circuit include a succession of single bit delay elements providing for from zero bit delay up to a number of bit delays equal to the said pre-selected number.

18. A decoder as recited in claim 17 wherein said phasing control circuit includes a count decoder and a counter, said counter receiving as an input signal each output signal from said decoder error determining circuit and producing an accumulated count output recycling at the said pre-selected number, and said count decoder decodes the count accumulation of said counter to correspondingly adjust the number of bit delays introduced by said delay circuits thereby to adjust the phasing of the parallel coded outputs of said buffer means as supplied to said decoder means.

19. A decoder as recited in claim 17 wherein:

said decoder means receives each parallel, coded output of said buffer means as successive groups of parallel digital signals of said pre-selected number, each including a respectively associated parity bit as the error correcting code for the said group, and said decoder means further includes a parity generator for generating a parity bit from the received digital signals of the group exclusive of the parity bit of the received group, means for comparing the generated parity bit with the received parity bit for determining the accuracy of the received digital signals, and means for correcting the received digital signals when the comparison of the generated parity bit and the received parity bit indicates an error in the received signals.

* * * * *